Patented Dec. 30, 1941

2,268,185

UNITED STATES PATENT OFFICE 2,268,185

PROCESS OF PREPARING METHYL ALPHA-METHYL-BETA-MERCAPTOPROPIONATE

William James Burke and Franklin Traviss Peters, Wilmington, Del., assignors to E. I. du Pont de Nemours & Company, Wilmington, Del., a corporation of Delaware No Drawing. Application March 10, 1939, Serial No. 261,115

1 Claim. (Cl. 260—481)

This invention relates particularly to a process of preparing methyl alpha-methyl-beta-mercaptopropionate.

An object is the preparation of new petroleum chemicals, pesticides, and intermediates for other chemical products. Other objects will appear hereinafter.

These objects are accomplished by the following invention wherein a monomeric ester of an alpha,beta-unsaturated monocarboxylic acid and preferably of an alpha methylene aliphatic monocarboxylic acid is reacted with hydrogen sulfide preferably in the presence of a basic catalyst, e. g. an amine. The products which are new and useful compositions of matter are derivatives of hydrogen sulfide and are esters of monomeric monocarboxylic acids having a mercapto (SH) group on the beta carbon atom and at least one hydrogen on the alpha carbon atom.

In a generally preferred mode of executing the process of the present invention, the ester of the alpha,beta-unsaturated acid, hydrogen sulfide, and a catalyst such as piperidine are placed in a pressure vessel, cooled in a suitable bath, e. g., an acetone-solid carbon dioxide bath. After the pressure vessel is sealed, it is heated at 75–180° C. for twelve to twenty-four hours, then cooled and opened. The components of the crude reaction product are separated by fractional distillation under reduced pressure.

The more detailed practice of the invention is illustrated by the following examples, wherein parts given are by weight. There are of course many forms of the invention other than these specific embodiments.

EXAMPLE I

METHYL 2-METHYL-3-MERCAPTOPROPIONATE

Twenty-four and five-tenths (24.5) parts of methyl α-methacrylate (0.245 mole) and twelve (12) parts of hydrogen sulfide (0.35 mole) are placed in a steel bomb cooled in an acetone-solid carbon dioxide bath. The closed vessel is heated for twelve hours at 200° C., after which it is cooled and opened and the resulting mixture is then distilled. Four (4) parts of methyl 2-methyl-3-mercaptopropionate

HSCH₂CH(CH₃)COOCH₃

B. P. 67–69° C./32 mm. containing 23.05% S, the theoretical amount being 23.88% is obtained.

EXAMPLE II

METHYL 2-METHYL-3-MERCAPTOPROPIONATE

Forty (40) parts of methyl α-methacrylate (0.4 mole), seventeen (17) parts of hydrogen sulfide (0.5 mole), and one (1) part of piperidine are added to a pressure tube cooled in an acetone-solid carbon dioxide bath. The tube is sealed and heated for twelve hours at 90° C., and is then cooled and opened. Upon distillation of the resulting mixture, twenty-nine (29) parts of methyl 2-methyl-3-mercaptopropionate, B. P. 58–60° C./10 mm., is obtained.

EXAMPLE III

BUTYL 2-METHYL-3-MERCAPTOPROPIONATE

In a pressure reactor cooled in an acetone-solid carbon dioxide bath are placed forty-two and six-tenths (42.6) parts of n-butyl-α-methacrylate (0.3 mole), seventeen (17) parts of hydrogen sulfide (0.5 mole) and one (1) part of piperidine. The reactor is closed and then heated for twelve hours at 90° C. After cooling, the reaction vessel is opened, the contents distilled, and the following fractions are obtained:

| Fraction | B. P. | Pressure | Parts |
|---|---|---|---|
| | °C. | Mm. | |
| 1 | 56–84 | 26 | 16 |
| 2 | 65–72 | 3 | 5 |
| 3 | 72–74 | 3 | 85 |
| Higher boiling and residue | | | 74 |

Fraction (1) is largely recovered n-butyl-α-methacrylate. Fraction (3) is butyl 2-methyl-3-mercaptopropionate, HSCH₂CH(CH₃)COOC₄H₉ containing 17.36% S, the theoretical content being 18.18%.

EXAMPLE IV

"COCONUT ALCOHOLS" ESTERS OF 2-METHYL-3-MERCAPTOPROPIONIC ACID

Forty-six (46) parts of the α-methacrylate of "coconut alcohols," i. e. the mixture of monohydric alcohols obtained by hydrogenation of coconut oil or oil acids, ten and six-tenths (10.6) parts of hydrogen sulfide, and one (1) part of piperidine are placed in a steel bomb tube cooled in an acetone-solid carbon dioxide bath. The tube is then closed and heated for twelve hours at 160° C. The tube is cooled and opened, and the product is removed and fractionally distilled. The fraction boiling at 130–156° C. is the "coconut alcohols" esters of 2-methyl-3-mercaptopropionic acid; it contains 10.25% sulfur, the theoretical content being 11.1%.

While in the process of the present invention, the temperature may range from that at which the reaction begins to be detectable—about 25°

C. in the presence of, and about 95° C. in the absence of, a catalyst—up to the decomposition temperature of the products, i. e. about 300° C. or even higher, and the pressure may be atmospheric, the results at the lower temperature extremes and at atmospheric pressure are not encouraging for any commercially feasible process. Best results are obtained at 75-180° C. in a closed system under superatmospheric pressure in the presence of a catalyst. Thus Example I above, although employing a temperature of 200° C., shows a yield of only 12% mercaptan whereas Example II which utilizes a catalyst shows a yield of 54% mercaptan at a reaction temperature of 90° C. Operation with a catalyst allows the use of lower temperatures.

While the examples disclose piperidine as the catalyst, any basic compound stable at reaction temperature may be used including basic organic compounds in general, e. g. butylamine, diethylamine, ethanolamine, morpholine, aniline, triethylamine, cyclohexylamine, phenyl hydrazine, tetramethylammonium hydroxide, sodium acetate, and sodium methylate, as well as basic inorganic compounds, e. g., sodium hydroxide, sodium carbonate, calcium oxide and ammonia.

The process is not limited to the ratio of reactants disclosed in the examples given. An excess of hydrogen sulfide beyond the 1:1 molar ratio increases the yield of the mercapto derivative.

While the illustrative examples show variations in the process as applied to the preparation of beta-carboalkoxypropyl derivatives of H—S—H by the interaction of the methyl, butyl, and the "coconut alcohols" esters of methacrylic acid with hydrogen sulfide, it is of generic applicability to any monomeric, preferably monohydric alcohol, ester of an alpha-beta-unsaturated monocarboxylic, preferably aliphatic monocarboxylic, acid. The products of the invention may be described as, and the invention is generic to, esters, preferably monohydric alcohol esters, of monomeric monocarboxylic, preferably aliphatic, acids having a mercapto (SH) group on the beta carbon and at least one hydrogen on the alpha carbon.

In the preferred modification of the invention, wherein the process is applied to monomeric monohydric alcohol esters of alpha-methylene open chain aliphatic monocarboxylic acids, i. e., open chain aliphatic monocarboxylic acids in which a $CH_2$ group is attached to the alpha carbon atom by an ethylenic double bond the resultant products are monomeric monohydric alcohol esters of alpha-mercaptomethyl aliphatic monocarboxylic acids having, in addition to the mercaptomethyl group at least one hydrogen on the alpha carbon atom. Similarly, when methacrylic acid esters are used, the products are esters of alpha mercaptomethyl propionic acid having a hydrogen atom, a methyl group and a mercaptomethyl group on the carbon alpha to the esterified carboxyl group.

Additional esters of $\alpha, \beta$-unsaturated monocarboxylic acids, and the products obtainable from them by the process of the present invention are listed in the table below:

Table I

| Ester | Mercaptan |
|---|---|
| Methyl acrylate $CH_2=CHCOOCH_3$ | Methyl-3-mercaptopropionate. $HSCH_2CH_2COOCH_3$ |
| Propyl acrylate $CH_2=CHCOOC_3H_7$ | Propyl 3-mercaptopropionate. $HSCH_2CH_2COOC_3H_7$ |
| Ethyl cinnamate $C_6H_5CH=CHCOOC_2H_5$ | Ethyl 3-mercapto-3 phenylpropionate. $C_6H_5CH(SH)CH_2COOC_2H_5$ |
| Cyclohexyl methacrylate $CH_2=C(CH_3)COOC_6H_{11}$ | Cyclohexyl 2-methyl-3-mercaptopropionate. $HSCH_2CH(CH_3)COOC_6H_{11}$ |
| Glycol monomethacrylate $CH_2=C(CH_3)COOCH_2CH_2OH$ | $\beta$-Hydroxyethyl 2-methyl-3-mercaptopropionate. $HSCH_2CH(CH_3)COOCH_2CH_2OH$ |
| $\beta$-Chloroethyl methacrylate $CH_2=C(CH_3)COOCH_2CH_2Cl$ | $\beta$-Chloroethyl 2-methyl-3-mercaptopropionate. $HSCH_2CH_2(CH_3)COOCH_2CH_2Cl$ |
| Sec-butyl methacrylate $CH_2=C(CH_3)COOCH(CH_3)C_2H_5$ | Sec-butyl 2-methyl-3-mercaptopropionate. $HSCH_2CH(CH_3)COOCH(CH_3)C_2H_5$ |
| Ter-butyl methacrylate $CH_2=C(CH_3)COOC(CH_3)_3$ | Ter-butyl 2-methyl-3-mercaptopropionate. $HSCH_2CH(CH_3)COOC(CH_3)_3$ |
| Ethyl crotonate $CH_3CH=CHCOOC_2H_5$ | Ethyl 3-mercaptobutyrate. $CH_3CH(SH)CH_2COOC_2H_5$ |
| Phenyl methacrylate $CH_2=C(CH_3)COOC_6H_5$ | Phenyl 2-methyl-3-mercaptopropionate. $HSCH_2CH(CH_3)COOC_6H_5$ |
| $\beta$-Ethoxyethyl methacrylate $CH_2=C(CH_3)COOCH_2CH_2OC_2H_5$ | $\beta$-Ethoxyethyl 2-methyl-3-mercaptopropionate. $HSCH_2CH(CH_3)COOCH_2CH_2OC_2H_5$ |
| Methyl alpha-ethylacrylate $CH_2=C(C_2H_5)COOCH_3$ | Methyl 2-ethyl-3-mercaptopropionate. $HSCH_2CH(C_2H_5)COOCH_3$ |
| Methyl alpha-heptylacrylate $CH_2=C(C_7H_{15})COOCH_3$ | Methyl 2-heptyl-3-mercaptopropionate. $HSCH_2CH(C_7H_{15})COOCH_3$ |
| Methyl alpha-phenylacrylate $CH_2=C(C_6H_5)COOCH_3$ | Methyl 2-phenyl-3-mercaptopropionate. $HSCH_2CH(C_6H_5)COOCH_3$ |
| Methyl tiglate $CH_3CH=C(CH_3)COOCH_3$ | Methyl 2-methyl-3-mercaptobutyrate. $CH_3CH(SH)CH(CH_3)COOCH_3$ |
| Methyl dimethylcrotonate $(CH_3)_2C=C(CH_3)COOCH_3$ | Methyl 2,3-dimethyl-3-mercaptobutyrate. $(CH_3)_2C(SH)CH(CH_3)COOCH_3$ |

The mercaptans of the present invention have the formula:

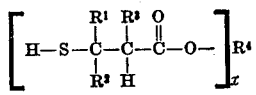

wherein $R^4$ is the radical of an organic hydroxyl compound, i. e. an alcohol or phenol minus at least one of its hydroxyl groups and $x$ is the number of the missing hydroxyl groups, $R^4$ may be saturated or unsaturated, monovalent or polyvalent, aliphatic, aromatic, alicyclic or heterocyclic, but is usually aliphatic and is preferably monovalent. The corresponding alcohols and phenols are, for example, methanol, cyclohexanol, benzyl alcohol, ethoxyethanol, dodecanol-1, beta-chloroethanol, sec. butanol, phenol, naphthol, furfuryl alcohol, glycol, glycerol, xylenol.

When $R^4$ is monovalent, i. e. when the alcohol is monohydric, or if polyhydric is only esterified with one mol of acid the formula reduces to

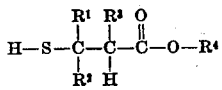

wherein $R^1$, $R^2$, and $R^3$ have the same values as before, i. e., may each be hydrogen or a monovalent, saturated or unsaturated, substituted or unsubstituted, aliphatic, aromatic, alicyclic, or heterocyclic organic radical, for example, methyl, benzyl, allyl, dodecyl, cyclohexyl, phenyl, beta-hydroxyethyl, beta-chloroethyl, sec. butyl, beta-ethoxyethyl, etc.

The new esters of hydrogen sulfide prepared as described herein may be used as petroleum chemicals, pesticides, agents for controlling the emulsion polymerization of chloroprene, and as intermediates in the preparation of other compounds.

The process of preparing the present derivatives of hydrogen sulfide by the interaction of hydrogen sulfide and alpha,beta-unsaturated esters is a one-step process which may be readily carried out. The products may be obtained in good yields and may be readily isolated by fractional distillation. The reaction may be carried out under a wide variety of conditions of temperatures, pressure, and concentration of reactants. These variables may be adjusted for each particular alpha,beta-unsaturated ester to obtain the optimum yield of the mercaptan. As shown above, this process is applicable to a wide variety of alpha,beta-unsaturated esters.

The above description and examples are intended to be illustrative only. Any modification of or variation therefrom which conforms to the spirit of the invention is intended to be included within the scope of the claim.

We claim:

Process of preparing methyl alpha-methyl-beta-mercaptopropionate which comprises putting approximately one and one-half mols of hydrogen sulfide with one mol of monomeric methyl methacrylate in an autoclave, heating at 200° C. under superatmospheric pressure, and isolating the methyl alpha-methyl-beta-mercaptopropionate.

WILLIAM JAMES BURKE.
FRANKLIN TRAVISS PETERS.